Aug. 13, 1929.                A. BURCH ET AL                1,724,639
              APPARATUS FOR WASHING FRUITS AND OTHER VEGETABLES
                            Filed April 18, 1927
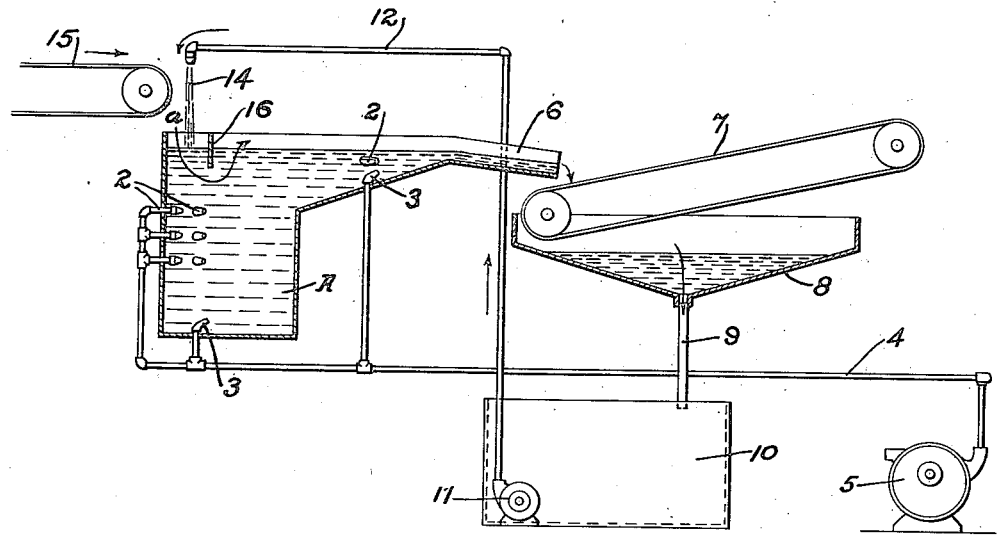
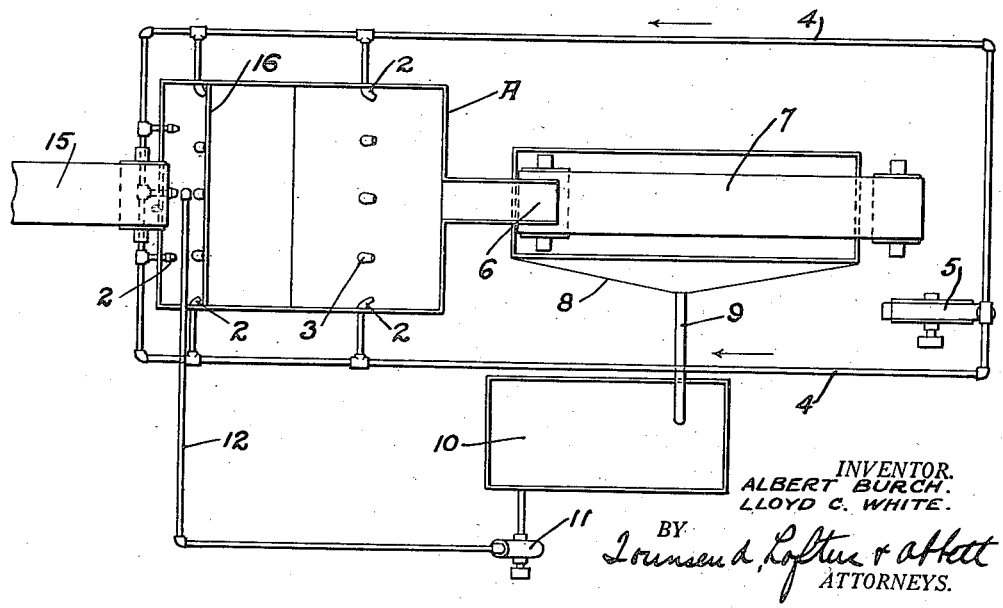
INVENTOR.
ALBERT BURCH.
LLOYD C. WHITE.
BY
ATTORNEYS.

Patented Aug. 13, 1929.

1,724,639

UNITED STATES PATENT OFFICE.

ALBERT BURCH, OF MEDFORD, OREGON, AND LLOYD C. WHITE, OF BERKELEY, CALIFORNIA.

APPARATUS FOR WASHING FRUITS AND OTHER VEGETABLES.

Application filed April 18, 1927. Serial No. 184,515.

This invention relates to a machine or apparatus for washing fruits, vegetables and other products and especially to an apparatus in which the product is washed by the combined action of compressed air and a liquid.

The spraying of fruits during growth with a poisonous spray solution containing copper sulphate, arsenate of lead, etc. to prevent destruction by insect pests has become very common. The spray solution dries on the surface of the fruit and should be removed by a washing operation or otherwise before the fruit is placed on the market as there is often a sufficient amount of poisonous deposit left on the fruit to cause serious results. Ordinary washing by hand or by placing the fruit in running water is a mere superficial treatment as it does not remove all of the poison from the more or less inaccessible places such as the recesses in which the stems are located as in apples, etc.

The object of the present invention is to generally improve and simplify the construction and operation of an apparatus for washing fruits, vegetables and other products; to provide an apparatus in which the product is washed by the combined action of air and a liquid; to provide an apparatus of large capacity in which fruits such as apples, etc. may be delivered, washed and removed without danger of bruising or in any manner injuring the fruit; and further to provide an apparatus which will insure complete removal of the spray matter from all recesses and exterior exposed surfaces. The apparatus is shown by way of illustration in the accompanying drawings in which Fig. 1 is a sectional view of the apparatus.

Fig. 2 is a plan view of the same.

Referring to the drawings in detail and particularly Fig. 1, A indicates a tank which is adapted to contain a liquid such as water or the like. Extending through the sides of the container and also the bottom thereof as indicated at 2 and 3 respectively, are a plurality of nozzles which serve the function of introducing compressed air into the liquid, the air being supplied from a main pipe line 4 which may be connected with an air compressor or the like indicated at 5. Formed at one end of the tank is an overflow in the form of a flume or the like as indicated at 6. Disposed below the overflow is a discharge conveyor 7 and disposed below the conveyor is a catch basin 8 which is connected by means of a pipe 9 with a sump 10. Connected with the sump is a pump 11 and connected with the pump is a discharge pipe 12 which returns the liquid to the tank at the point 14.

To describe the use and operation of the apparatus, it will be assumed that apples are to be washed. If this is the case, the apples are delivered to a conveyor such as indicated at 15. This conveyor delivers the fruit to the tank A at a point just above the same and the apples will thus drop by gravity one by one into the liquid. If the apples have been sprayed with a solution containing arsenate of lead, it is desirable to use a diluted solution of water and hydrochloric acid as this is found to be a solvent. The apples delivered to the container are maintained in continuous motion and are at the same time subjected to the air which discharges through the nozzles 2 and 3. In this manner the apples are floated and tumbled about in the air rising through the liquid and the air and liquid impacts against the apples and as such reaches the most inaccessible points such as the recesses where the stems are located, etc., thereby insuring a thorough and efficient washing in a rapid and efficient manner. In actual practice an elongated tank is preferable and it is also preferable to place the nozzles 2 and 3 so that they will discharge the air on a tangent to the inner surface of the tank; the air thus maintains the water or wash solution in continuous circular motion. This is also important as it prevents the apples from dropping one on top of the other and to this extent eliminates injury or bruising of the fruit. This will be readily understood by referring to Fig. 1, for instance, if the water is circulating in the direction of arrow $a$, it is obvious that each apple as it is dropped becomes completely submerged in the liquid and as the liquid is circulated in the direction of arrow $a$, it will be carried away from the point of delivery, thus leaving a clear and unobstructed surface for the apples which follow. This unobstructed surface being further insured by a baffle plate 16 extending crosswise of the tank and under which the fruit is caused to pass with the circulating liquid. The submerging action of the fruit is further insured by placing the return pipe 12 at a point directly above and forward of the conveyor 15. The wash solution discharging downwardly into the tank thus impinges against each apple as it is delivered and thereby imparts velocity to the fruit which insures further and deeper submersion. This action of the returning wash solution is again of importance as it produces an impinging and washing action. The fruit may be removed from the container in any suitable manner but as a considerable volume of liquid is maintained in continuous circulation, the fruit may in this instance be discharged together with the wash solution through the flume 6. The fruit after removal is drained while being carried away by the conveyor 7 and the overflow solution together with the drain water is collected in the basin 8 from where it is returned to the sump to be recirculated. While an overflow discharge is here illustrated, we wish it understood that an underflow discharge may be employed or any other suitable device such as an elevator or the like.

While certain features of the present invention are more or less specifically described and indicated, we wish it understood that various changes may be resorted to within the scope of the appended claims; similarly, that the materials and finish of the several parts employed may be such as the manufacturer may dictate or varying conditions or uses may demand.

Having thus described our invention, what we claim and desire to secure by Letters Patent is:—

1. An apparatus for washing fruits and other products comprising a container for a liquid in which a product is adapted to be immersed, means whereby the product is delivered to the container, means whereby the liquid is circulated in a direction away from the point of delivery so that the product will be carried away and will not be bruised by dropping one on top of the other and means whereby the product is subjected to the action of compressed air discharged into the liquid substantially parallel to the surface of the liquid.

2. An apparatus for washing fruits and other products comprising a container for a liquid in which a product is adapted to be immersed, means whereby the product is delivered to the container, a discharge pipe disposed above the tank at a point where the product is delivered, means connected therewith for maintaining the liquid in circulation through the container and said pipe so that the liquid will be discharged downwardly on the product as it is delivered so as to cause submersion of the product and means whereby the product is subjected to the action of compressed air discharged into the liquid substantially parallel to the surface of the liquid, said air also serving the function of circulating the liquid in a direction away from the point of delivery so that the product will be carried away and will not be bruised by dropping one on top of the other.

3. An apparatus for washing fruits and other products comprising a container for a liquid in which a product is adapted to be immersed, means whereby the product is delivered to the container and dropped by gravity into the liquid, a discharge pipe disposed above the tank at a point where the product is delivered, means connected therewith for maintaining the liquid in circulation through the container and said pipe so that the liquid will be discharged downwardly on the product as it is delivered so as to cause submersion of the product and means whereby the product is subjected to the action of compressed air discharged into the liquid substantially parallel to the surface of the liquid, said air also serving the function of circulating the liquid in a direction away from the point of delivery so that the product will be carried away and will not be bruised by dropping one on top of the other and means whereby the product may be removed from the container.

4. An apparatus for washing fruits and other products comprising an elongated tank adapted to contain a liquid, a plurality of nozzles projecting through the tank and disposed parallel to the upper surface of the liquid, means for delivering compressed air to said nozzles so that the air will discharge into the liquid parallel to the surface and so that the air will impart a movement to the liquid, means whereby a product to be washed is delivered to the tank, a pump connected with the tank and adapted to maintain the liquid in constant circulation, a discharge pipe connected with the pump and adapted to discharge the liquid downwardly into the tank at the point where the product is delivered so as to impact on the product and cause complete submersion thereof in the liquid in the tank and means whereby the product may be removed from the tank.

5. An apparatus for washing fruits and other products comprising an elongated tank adapted to contain a liquid, a plurality of nozzles projecting through the tank and disposed parallel to the upper surface of the liquid, means for delivering compressed air to said nozzles so that the air will discharge into the liquid parallel to the surface and so that the air will impart a movement to the liquid, means whereby a product to be washed is delivered to the tank and dropped by gravity into the liquid, an overflow connection on the tank through which the liquid is adapted to overflow and through which the washed product is adapted to discharge, a conveyor adapted to receive the product after discharging from the tank, a sump to collect the overflow liquid, a pump connected with the sump, and a discharge pipe connected with the pump and adapted to return the liquid to the tank, said pipe discharging the liquid vertically downwardly into the tank at the point where the product is delivered so that it will impact with the product and cause complete submersion thereof.

6. An apparatus for washing fruits and other products, comprising an elongated tank adapted to contain a liquid, a plurality of nozzles connected with the sides, ends and bottom of the tank, means for delivering compressed air to said nozzles so that the air will discharge into the liquid and so that the air will impart movement to the liquid in one direction, means whereby a product to be washed is delivered to one end of the tank, a baffle plate disposed crosswise of the tank forward of the point of delivery, said plate being comparatively shallow, a pump connected with the tank and adapted to maintain the liquid in constant circulation, a discharge pipe connected with the pump and adapted to return the liquid and discharge it downwardly into the tank at a point behind the baffle plate where the product is delivered so as to impact on the product and cause the product to be completely submerged and to pass under the baffle plate and means whereby the product is removed from the tank.

7. An apparatus for washing fruits and other products, comprising a container, a liquid in said container, means for dropping the articles to be washed into said container to cause submersion thereof, adjacent one end thereof; a baffle bar in said container extending downwardly into the liquid a distance less than the articles are submerged, said baffle bar being located adjacent the point where the articles are introduced into the container; a plurality of nozzles below said baffle bar, means for introducing compressed air to said nozzles, said nozzles being oriented in such a direction as to blow said compressed air under said baffle bar and carry the articles introduced into the container in a forward direction under said bar.

8. An apparatus for washing fruits and other products, comprising a container and liquid in said container, a baffle bar in said container extending parallel to one edge thereof and extending under the surface of the liquid; means to drop articles to be cleaned between said baffle bar and the edge of the container to cause the articles to submerge to a point below the baffle bar, and means comprising nozzles adapted to project compressed air into said liquid for causing said articles to be carried in a forward direction under said baffle bar.

9. An apparatus for washing fruits and other products, comprising a container and liquid in said container, a baffle bar in said container extending parallel to one edge thereof and extending under the surface of the liquid; means to drop articles to be cleaned between said baffle bar and the edge of the container to cause the articles to submerge to a point below the baffle bar, and means comprising nozzles adapted to project compressed air into said liquid for causing said articles to be carried in a forward direction under said baffle bar, and a discharge nozzle located above said container adapted to project a stream of liquid onto the articles as they are dropped into the container.

ALBERT BURCH.
LLOYD C. WHITE.